E. BETTS.
UNIVERSAL JOINT.
APPLICATION FILED MAY 20, 1912.

1,066,425.

Patented July 1, 1913.

Witnesses
R. B. Lewis,
Wm. Dyson

Inventor
Everett Betts,
By Chas. F. Schmelz
Attorney

UNITED STATES PATENT OFFICE.

EVERETT BETTS, OF DETROIT, MICHIGAN.

UNIVERSAL JOINT.

1,066,425. Specification of Letters Patent. Patented July 1, 1913.

Application filed May 20, 1912. Serial No. 698,362.

*To all whom it may concern:*

Be it known that I, EVERETT BETTS, a citizen of Great Britain, residing at Detroit, in the county of Wayne and State of Michigan, have invented certain new and useful Improvements in Universal Joints, of which the following is a specification.

This invention relates to universal joints, and it has for its object the provision of a simple and easy-movement joint which can be readily taken apart and reassembled.

The invention has been clearly illustrated in the accompanying drawings, in which similar characters denote similar parts, and in which—

Figure 1:
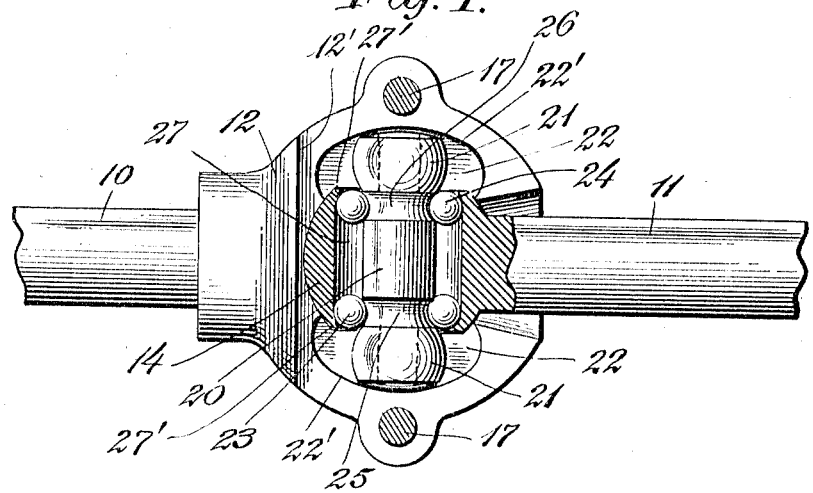
Figure 2:
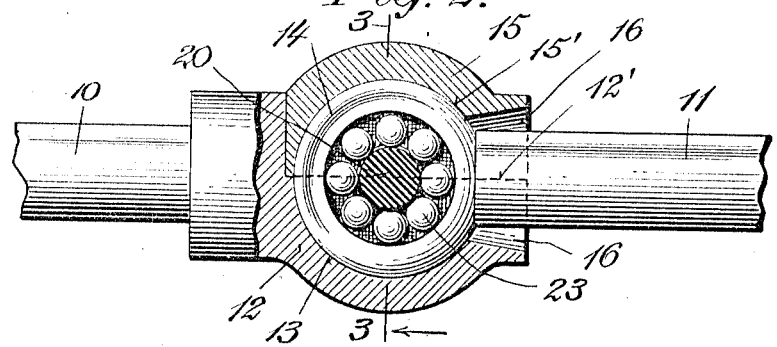
Figure 3:
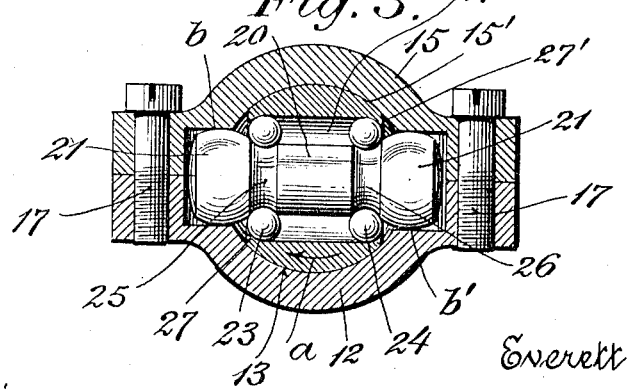

Figure 1 illustrates a side view of a universal joint embodying my invention, Fig. 2 is a vertical longitudinal section thereof, and Fig. 3 shows a section on line 3, 3 of Fig. 2.

Referring to the drawings, 10 and 11 represent a pair of shafts which are coupled by my improved joint which comprises a socket-section 12 secured to the shaft 10 and having a central spherical recess 13 adapted to receive one-half of a ball member 14 which is secured to or forms a part of the shaft 11. The socket member 12 is cut away as at 12' to provide a seating surface for a cap 15 which has a recess 15' similar to the recess 13, to coöperate therewith in forming the complete socket for the ball 14. The front ends of the cap and socket sections are cut out, as at 16 to allow play for the deflection of the shafts, and the cap is held in place by screws 17.

Means are provided for causing both shafts to be rotated in unison, these means constituting the principal feature of the present invention and comprising a cross-spindle 20 which has at its ends a pair of crown-faced heads 21 which may be secured to the spindle or be integral therewith provided however that their diameters are of the same size. These heads are disposed within arcuate recesses 22 formed in the socket and cap-members 12, 15, so that they may swing around the center of the ball 14, and the outer ends of the heads are preferably crowned to correspond to the curvature of the outer recess-walls 22'.

The spindle 20 is journaled in the ball 14, by sets of anti-friction balls 23, 24, running in races or grooves 25, 26 in the spindle and engaging the inner cylindrical surface of an aperture or perforation 27 in the ball 14, the outer edges 27' of which are preferably spun inward and thus hold the spindle and balls 23, 24 in place within the ball 14 when the latter is taken out of the socket.

Rotation of the ball 14 in the direction of arrow *a* (Fig. 3) will result in causing the spindle ends, or heads to contact with the bottom walls of the recesses *b*, *b'*, and if (as above stated) the diameters of the heads are the same, and also equi-distant from the center of the ball 14, a perfect and free rolling action between spindle and socket member will result with both heads rotating in unison and without drag on either one or the other, or both, when the axes of the shafts 10 and 11 are out of alinement, and they are rotated in that condition.

I claim:—

1. A universal joint comprising a two-part socket member having a central spherical recess and a pair of diametrically opposite arcuate recesses, a ball in the spherical recess, and a spindle journaled in said ball and having integral crowned heads engaging said arcuate recesses, and provided with a pair of raceways, anti-friction balls in said raceways and engaging said ball, and means for holding said spindle, antifriction balls, and the said ball together.

2. A universal joint comprising a two-part socket member having a spherical recess and a pair of diametrically-opposite arcuate recesses, a sphere in the spherical recess and having a cylindrical perforation, a spindle, and anti-friction balls between said spindle and the surface of said perforation, said spindle projecting through said perforation into said arcuate recesses, and the edges of said perforation being contracted to retain the spindle, antifriction balls and sphere together.

In testimony whereof I affix my signature in presence of two witnesses.

EVERETT BETTS.

Witnesses:
H. L. COWLES,
H. D. MACDONALD.